US011833605B2

(12) United States Patent
Zhao

(10) Patent No.: US 11,833,605 B2
(45) Date of Patent: Dec. 5, 2023

(54) METHOD FOR WELDING A TITANIUM COMPONENT WITH A TITANIUM NITRIDE COATING

(71) Applicant: Medtronic, Inc., Minneapolis, MN (US)

(72) Inventor: Hailiang Zhao, Plymouth, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 17/348,317

(22) Filed: Jun. 15, 2021

(65) Prior Publication Data

US 2022/0001481 A1 Jan. 6, 2022

Related U.S. Application Data

(60) Provisional application No. 63/048,410, filed on Jul. 6, 2020.

(51) Int. Cl.
B23K 11/16 (2006.01)
B32B 15/01 (2006.01)
B23K 11/34 (2006.01)
B23K 101/34 (2006.01)
B23K 103/14 (2006.01)

(52) U.S. Cl.
CPC ............ B23K 11/163 (2013.01); B23K 11/34 (2013.01); B32B 15/01 (2013.01); *B23K 2101/34* (2018.08); *B23K 2103/14* (2018.08); *Y10T 428/12806* (2015.01)

(58) Field of Classification Search
None
See application file for complete search history.

(56) References Cited

U.S. PATENT DOCUMENTS 4,434,189 A 2/1984 Zaplatynsky
2010/0171055 A1* 7/2010 Dourdeville ......... B23K 20/233
251/129.11

FOREIGN PATENT DOCUMENTS

JP 2007111707 A 5/2007

OTHER PUBLICATIONS

English translation of JP2007111707, EPO, accessed Aug. 9, 2022.*
Black et al., "A New Method for Isolating Plasma Interactions from those of the Laser Beam During Plasma Nitriding", Materials Characterization, Elsevier, New York, NY, US, vol. 134, Oct. 13, 2017, 36 pp., XP085298419, ISSN: 1044-5803, DOI: 10.1016/J/MATCHAR.2014.10.011.
Huang et al., "Laser Hole Sealing of Commercially Pure Grade 1 Titanium", Journal of Laser Applications, American Institute of Physics, 2 Huntington Quadrangle, Melville, NY 11747, vol. 24, No. 3, Aug. 2012, pp. 32010-1-32010-8, XP012163046, ISSN: 1042-346X, DOI: 10.2351/1.4729169.
International Search Report and Written Opinion of International Application No. PCT/US2021/038418, dated Nov. 23, 2021, 12 pp.

(Continued)

*Primary Examiner* — Xiaobei Wang
(74) *Attorney, Agent, or Firm* — Shumaker & Sieffert, P.A.

(57) ABSTRACT

A workpiece of Ti or a Ti alloy includes a surface with a coating layer of titanium nitride. A region of the surface includes a connection zone of a Ti—N solid solution alloy. A second Ti or Ti alloy workpiece is contacted with the connection zone, and a weld joint is formed across the connection zone with a resistance welding process. The weld joint extends into the first Ti workpiece and the second Ti workpiece.

17 Claims, 8 Drawing Sheets

(56) References Cited

OTHER PUBLICATIONS

Sahsrabudhe et al., "Laser Processing of In Situ TiN/Ti Composite Coating on Titanium", Journal of the Mechanical Behavior of Biomedical Materials, Elsevier, Amsterdam, NL, vol. 53, Jan. 1, 2016, pp. 239-249, XP009500617, ISSN: 1751-6161, DOI: 10.1016/J.JMBBM.2015.08.013.

* cited by examiner

METHOD FOR WELDING A TITANIUM COMPONENT WITH A TITANIUM NITRIDE COATING

This application claims the benefit of U.S. Provisional Patent Application No. 63/048,410, filed 6 Jul. 2020, the entire contents of which is incorporated herein by reference.

BACKGROUND

An exposed surface of a titanium or titanium alloy-containing component can form a resistive film that can compromise the performance of the component in an electrical device. For example, formation of a resistive film on a Ti-containing cathode current collector in a battery can cause high impedance failure and can potentially shorten battery life.

To prevent formation of resistive films, a protective coating layer can be applied to an exposed surface of the Ti-containing component. However, when the Ti-containing component is welded to another Ti-containing component in a manufacturing process, the presence of the protective coating layer can interfere with the formation of a good metallurgical bond at an interface between the Ti-containing components.

Titanium nitride thin films are widely used to form a durable protective coating on a wide variety of metal components including, for example, Ti-containing parts used in implantable medical devices. If a Ti-containing component is coated with protective layer of titanium nitride, the presence of titanium nitride at the weld interface is particularly challenging for resistance spot welding (RSW) due to the difficulty in melting and dissolving the titanium nitride film to form a metallurgical bond at the joint interface.

One solution to this problem is to precisely deposit the titanium nitride layer on the Ti-containing component using a process such as, for example, physical vapor deposition, chemical vapor deposition, or sputtering, such that regions to be welded are shielded from titanium nitride. However, vapor deposition and sputtering processes are expensive and relatively slow, and improved manufacturing methods are needed to provide reliable weld joints between Ti-containing components coated with a protective layer such as titanium nitride.

SUMMARY

In some cases, manufacturing costs can be reduced by applying a protective coating including titanium nitride to surfaces of a first Ti-containing component using a thermal nitriding process. While faster and less expensive than vapor deposition processes, the thermal nitriding process deposits the titanium nitride coating on the entire surface of the first Ti-containing component, including regions of the surface that are subsequently used to weld the first Ti-containing component to a second Ti-containing component.

In general, the present disclosure describes a method for forming a welded joint to a surface of a Ti-containing workpiece, wherein the surface is overlain with a protective coating layer including titanium nitride. The method includes conditioning a region of the titanium nitride coating layer at a weld site to form a connection zone including a Ti—N solid solution alloy. A weld joint is then formed across the connection zone to join the first Ti-containing workpiece to an adjacent second Ti-containing workpiece. In some embodiments, the conditioned connection zone includes a higher electrical resistance and lower liquidus temperature than the titanium nitride coating, which makes the connection zone suitable for quickly and inexpensively forming strong and reliable welds using a resistance welding process such as resistance spot welding (RSW).

The method of the present disclosure can be used to form welds between any Ti-containing workpieces, and is particularly suitable for forming weld joints between components in an implantable medical device such as, for example, a sensor, a pacemaker, a defibrillator, and the like. In one embodiment, which is not intended to be limiting, the methods of the present disclosure may be used to form a weld joint between Ti-containing components of a battery in an implantable medical device such as, for example, between a cathode current collector and a battery cover.

In one aspect, the present disclosure is directed to a workpiece of Ti or a Ti alloy, wherein the workpiece includes a surface with a coating layer of titanium nitride. A region of the surface includes a zone of a Ti—N solid solution alloy.

In another aspect, the present disclosure is directed to an article including a first workpiece including Ti, wherein the first workpiece has a first surface with at least one coating layer of titanium nitride. A region of the first surface includes a connection zone of a Ti—N solid solution alloy. A second workpiece including Ti has a second surface contacting the connection zone. A weld joint extends across the connection zone and extends into the first surface of the first workpiece and the second surface of the second workpiece. The weld joint has an acicular microstructure and a nitrogen concentration: (1) lower than a nitrogen concentration in the connection zone, and (2) higher than a nitrogen concentration in either of the first workpiece or the second workpiece.

In another aspect, the present disclosure is directed to a method including conditioning a region of a workpiece including Ti for subsequent resistance welding across the region. The workpiece includes a surface overlain by a titanium nitride coating layer, and wherein the method includes heating the region to form a connection zone including a Ti—N solid solution alloy.

In another aspect, the present disclosure is directed to a method include heating a region of a first workpiece including Ti, wherein the first workpiece includes at least one titanium nitride coating layer, to form in the region a connection zone including a Ti—N solid solution alloy; contacting a second workpiece including Ti with the connection zone; and forming with a resistance welding process a weld joint across the connection zone, wherein the weld joint extends into the first Ti workpiece and the second Ti workpiece.

In another aspect, the present disclosure is directed to a method of making a battery for an implantable medical device. The method includes providing a first battery component including a Ti alloy, the first battery component further including a connection region overlain by a titanium nitride coating layer; heating the connection region with a laser to form in the connection region a connection zone including a Ti—N solid solution alloy; providing a second battery component, the second battery component including a Ti alloy; contacting a surface of the second battery component with the connection zone; and forming with a resistance welding process a weld joint across the connection zone, wherein the weld joint extends into the first battery component and the second battery component, and wherein the weld joint has an acicular microstructure.

In another aspect, the present disclosure is directed to an implantable medical device including a battery. The battery includes a resistance weld between a first component including Ti and a second component including Ti, wherein the resistance weld extends across a connection zone including a Ti—N solid solution alloy. The resistance weld has an acicular microstructure and a nitrogen concentration: (1) lower than a nitrogen concentration in the connection zone, and (2) higher than a nitrogen concentration in either of the first Ti alloy component or the second Ti alloy component.

The details of one or more examples are set forth in the accompanying drawings and the description below. Other features, objects, and advantages will be apparent from the description and drawings, and from the claims.

BRIEF DESCRIPTION OF DRAWINGS

Like symbols in the drawings indicate like elements.

DETAILED DESCRIPTION

Figure 1A:
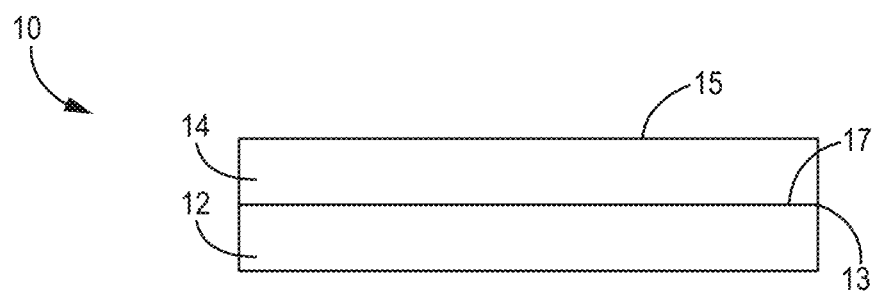
FIG. 1A is a schematic cross-sectional view of an embodiment of a Ti-containing workpiece with a titanium nitride coating layer thereon.

Referring to FIG. 1A, a portion of a component 10 includes a Ti-containing workpiece 12 overlain by a protective coating layer 14. The workpiece 12 and the protective coating 14 are in contact along an interface 13.

The workpiece 12 may include Ti or Ti alloyed with Ni, Pd, Al, V, Sn, V, Mo, Nb and mixtures and mixtures and combinations thereof. Some examples of suitable Ti alloys include, but are not limited to, Ti-6Al-4V, Ti-3Al-2.5V, and the like. In some embodiments, the workpiece 12 may formed from commercially pure Ti (grades 1-4), and for medical device applications may include Grade 1 Ti.

The coating layer 14 may include any material that is chemically compatible with the Ti-containing workpiece 12 and can reduce or substantially eliminate corrosion of the workpiece 12. Suitable examples include, but are not limited to, titanium nitride (TiN) and variants thereof such as titanium carbon nitride (TiCN), titanium aluminum nitride (TiAlN or AlTiN), and titanium aluminum carbon nitride, each of which, as well as combinations thereof, are referred to herein generally as titanium nitride. The protective coating 14 can include a single layer or multiple layers of titanium nitride. In some example embodiments, the protective coating 14 can include layers of any of the titanium nitride variants individually, or the titanium nitride variants may be used in alternating layers with titanium nitride.

The coating layer 14 may be formed on a surface 17 of the workpiece 12 by any suitable method, and as noted above vapor deposition, sputtering, thermal nitriding and the like may be used. Thermal nitriding has been found to be a suitable and cost efficient approach for forming the coating layer 14 in manufacturing operations, and forms a substantially continuous titanium nitride intermetallic film on the surface 17 of the workpiece 12. In various embodiments, the coating layer 14 may be formed on all or a selected portion of the surface 17 of the workpiece 12.

In various example embodiments, the protective coating layer 14 has an average coating thickness, measured by mass gain per unit area, on the surface of the workpiece of about 50 $\mu g/cm^2$ to about 200 $\mu g/cm^2$, or about 85 $\mu g/cm^2$ to about 140 $\mu g/cm^2$.

To condition at least a portion of the surface 15 for subsequent welding and joining operations, at least a portion of the protective coating 14 is heated and melted at a temperature and for a time sufficient that the titanium nitride in the protective coating 14 is dissolved and mixed at the interface 13 with the Ti or Ti alloy at the adjacent surface 17 of the Ti-containing workpiece 12.

Figure 1B:
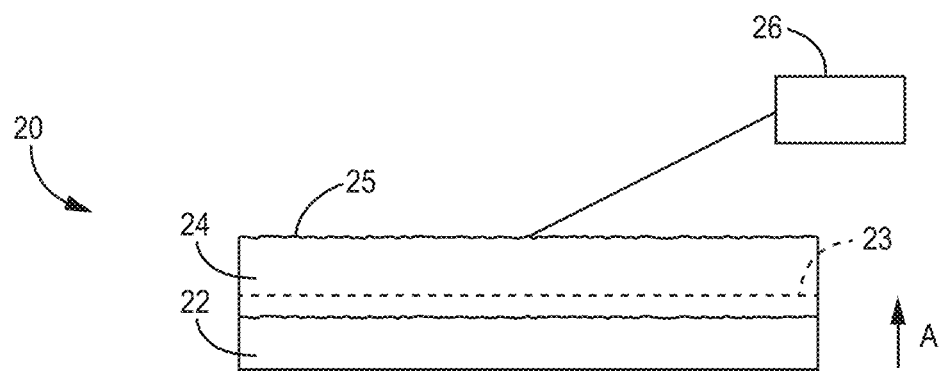
FIG. 1B is a schematic cross-sectional view of a Ti-containing workpiece including a titanium nitride solid solution alloy connection zone, and a laser utilized to form the connection zone.

As shown schematically in FIG. 1B, in one embodiment a surface 25 of the protective coating of a component 20 is heated with a laser 26 to form a connection zone 24 on a workpiece 22. In various embodiments, any suitable industrial laser may be used to perform the heating process such as, for example, solid state lasers, $CO_2$ lasers, fiber lasers, and the like. In some example embodiments, which are not intended to be limiting, the laser may use a constant beam diameter and scan over the surface 25 to melt the surface 25 and the underlying workpiece 22. In some example embodiments, the laser scanning may optionally be performed under a shielding gas such as, for example, Ar. While lasers have been found to be particularly useful in an industrial setting for heating the surface 25, the surface 25 may be heated with any suitable process such as, resistance heating, electron beams, microwaves, electrical arc, plasma, and the like.

Any suitable technique may be used to heat the surface 25, and in embodiments in which a laser is used, the laser may be scanned over the surface 25 in any suitable pattern. For example, in some embodiments the surface 25 may be heated by applying laser pulse in a pattern of concentric circles. In various embodiments, which are not intended to be limiting, suitable speeds for movement of a suitably sized laser beam across the surface 25 to form the connection zone 24 include, but are not limited to, about 1 inch per minute (0.04 cm/sec) to about 10 inch per minute (0.4 cm/sec). In various embodiments, which are not intended to be limiting, suitable laser heating duration at each spot is about $1\times10^{-3}$ sec to about $1\times10^{-2}$ sec.

The connection zone 24 extends across the original interface between the protective coating and the workpiece marked with a dashed line 23, and extends into the Ti-containing workpiece 22. The melting and mixing of the titanium nitride along the interface and into the Ti-containing workpiece 22 forms a Ti—N solid solution alloy in the connection zone 24. While not wishing to be bound by any theory, presently available evidence indicates that in some embodiments the connection zone 24 includes a Ti—N solid solution alloy matrix with embedded particles of titanium nitrides.

The Ti—N solid solution alloy in the connection zone 24 has a nitrogen concentration higher than the nitrogen concentration in the workpiece 22, and as such a gradient of nitrogen concentration increases in the workpiece 22 along the direction of the arrow A.

In some embodiments, the connection zone 24 has at least one of a lower liquidus temperature and higher resistance to electrical current flow than the titanium nitride intermetallic film of the original coating layer 14. These material properties make the connection zone 24 particularly well suited for forming a metallurgical bond to another Ti-containing workpiece at the surface 25 with a welding operation such as, for example, resistance spot welding (RSW).

In some embodiments, the addition of nitrogen in the Ti or Ti alloy of the workpiece 22 can increase the hardness of the connection zone 24 or reduce the ductility of the connection zone 24 relative to the original workpiece 12.

In some example embodiments, the connection zone 24 has a thickness of about 0.010 mm to about 0.01 mm.

Figure 2A:
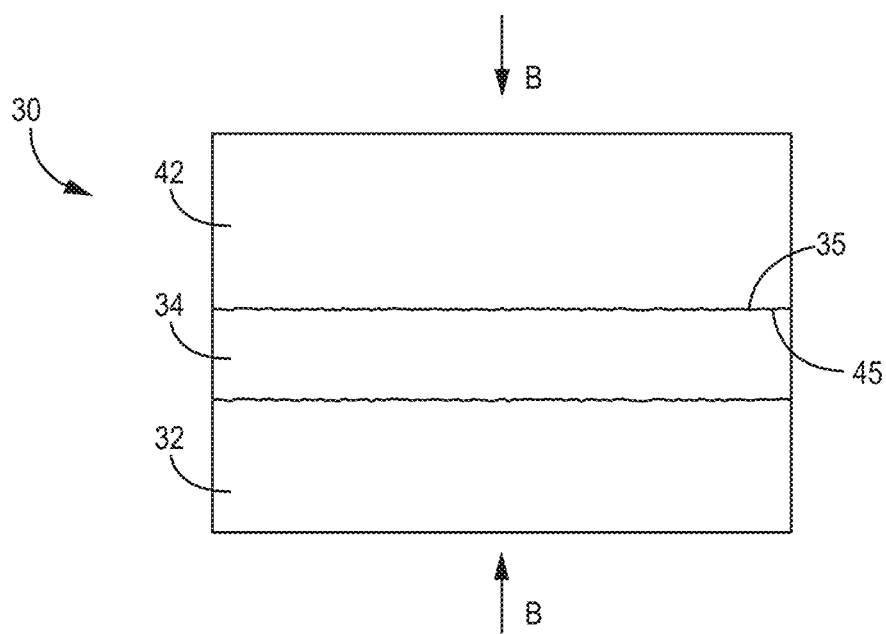
FIG. 2A is a schematic cross-sectional view of the workpiece of FIG. 1B in contact with a second Ti-containing workpiece prior to a resistance welding operation.

Referring now to FIG. 2A, in a welding or joining process a first Ti-containing workpiece 32 including a connection zone 34 having a Ti—N solid solution alloy as described above in FIG. 1B is contacted along a surface 35 with a surface 45 of a second Ti-containing workpiece 42. In various embodiments, the second Ti-containing workpiece 42 can include any of the Ti or Ti alloys listed above for the first workpiece 32, and need not have the same composition as the first workpiece 32. In some embodiments, pressure may optionally be applied along the direction of the arrows B to press the surface 45 of the second workpiece 42 against the surface 35 of the connection zone 34.

Figure 2B:
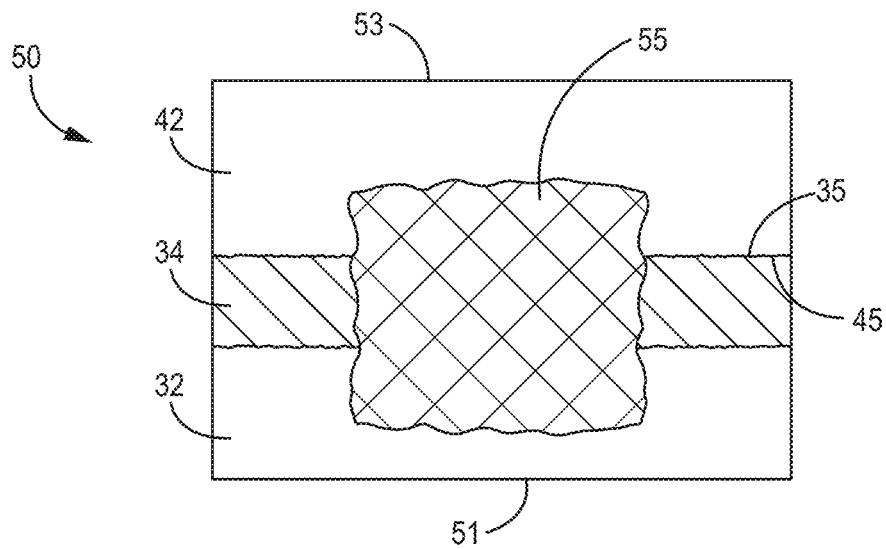
FIG. 2B is a schematic cross-sectional view of the workpieces of FIG. 2A following a resistance welding process, and showing a weld joint with extending into the first and the second workpieces.

Referring to FIG. 2B, in a resistance welding process electrodes are placed at a first exposed surface 51 of the first workpiece 32 and a second exposed surface 53 of the second workpiece 42. A suitable resistance weld current is then applied to the workpieces 32, 42 to form a weld joint 55 at an interface between the first workpiece 32 and the second workpiece 42. As shown in FIG. 2B, the weld joint 55 extends across the connection zone 34 and into the first workpiece 32 and the second workpiece 42, and in some embodiments changes the microstructure of the workpieces 32, 42. During resistance welding, the nitrogen in the connection zone 34 diffuses further into the workpieces 32, 43, which alters the equiaxed grains typical of annealed Ti microstructure, and provides an acicular microstructure in the weld joint 55 having a nitrogen concentration lower than the nitrogen concentration in the connection zone 34, but higher than the nitrogen concentration in either of the workpieces 32, 42.

In some embodiments, the weld joint 55 has an increased microhardness compared to the workpieces 32, 42. In various embodiments, increased coating thickness of the titanium nitride coating layer 14 (FIG. 1A) can increase in microhardness for the weld joint 55, while increased weld current in the resistance welding process can lead to decreased microhardness in the weld zone. While not wishing to be bound by any theory, presently available evidence indicates that increased titanium nitride coating thickness can lead to increased nitrogen concentration in the weld joint 55, while increased weld current can further promote the diffusion of nitrogen into larger volume of the titanium in the workpieces 32, 42, which can reduce the nitrogen concentration in the weld joint 55.

In some embodiments, the resistance welding joint 55 can be formed under a shielding gas. Suitable shielding gases include, but are not limited to, inert gases such as, for example, argon, helium, and mixtures and combinations thereof.

In some example embodiments, to generate heat and form the weld joint 55 in a resistive heating process, lower welding currents can produce relatively weaker weld joints, while higher welding currents can potentially increase manufacturing risks such as splattering, expulsion, blown welds, and the like. In various embodiments, which are provided as examples and not intended to be limiting, suitable weld currents for a resistive welding process to form the weld joint 55 are about 500 A to about 900 A, or about 650 A to about 800 A at titanium nitride coating levels of about 50 µg/cm$^2$ to about 150 µg/cm$^2$.

Figure 2C:
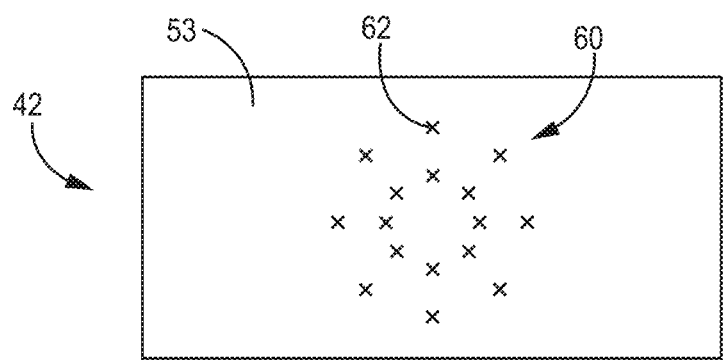
FIG. 2C is a schematic overhead view of the second workpiece of FIG. 2A showing an embodiment of a weld path pattern.

Referring to the schematic diagram in FIG. 2C, in some example embodiments the resistance welding process can include resistance spot welding (RSW) in any suitable weld path pattern. In one embodiment, which is not intended to be limiting, the resistance spot welds may be applied to the surface 53 of the second workpiece 42 (or the surface 51 of the first workpiece 32) in a concentric circular pattern 60 to form the weld joint 55, with individual spot weld points 62.

Since the weld joint 55 extends into both the adjacent first workpiece 32 and the second workpiece 42, the weld joint 55 shows good strength and resistance to separation of the joined workpieces 32, 42. For example, in some embodiments, the weld joint 55 has an average pull test failure load of about 15 lb (6.8 kg). In the pull tests referred to in the present application and the working examples below, a pull test failure occurs where one of the base materials fractures and at least part of the weld remains.

Figure 2D:
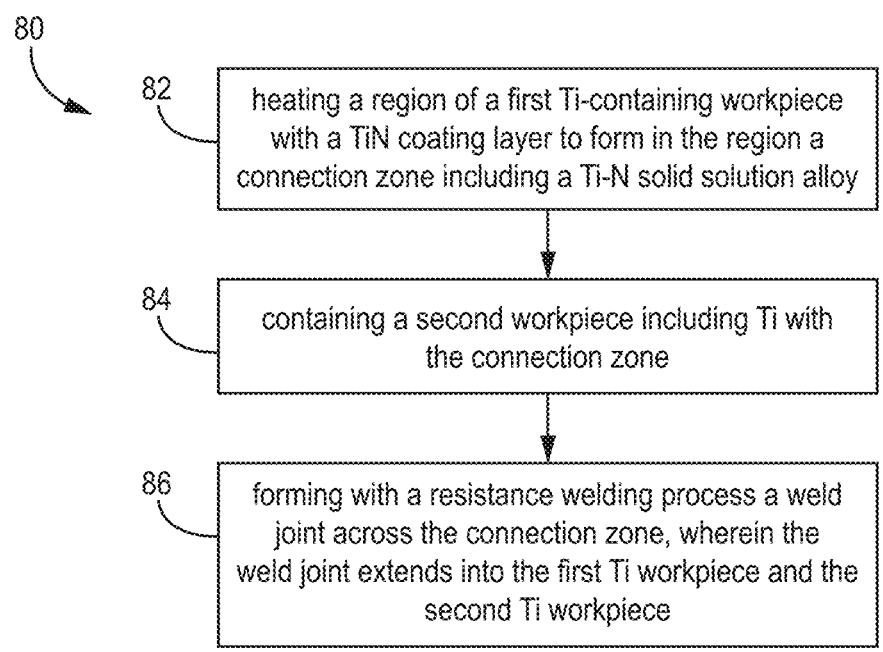
FIG. 2D is a flow chart of an embodiment of a method for making a weld joint according to the present disclosure.

Referring now to the flow chart of FIG. 2D, in another aspect the present disclosure is directed to a method 80 for forming a weld joint to a Ti-containing workpiece overlain by a titanium nitride coating layer.

In step 82, the method 80 includes heating a region of a first workpiece including Ti, wherein the first workpiece includes a titanium nitride coating layer, to melt the titanium nitride coating and part of the Ti-containing workpiece and to form in the region a connection zone including a Ti—N solid solution alloy.

In step 84, the method 80 includes contacting a second workpiece including Ti with the connection zone.

In step 86, the method 80 includes forming with a resistance welding process a weld joint across the connection zone, wherein the weld joint extends into the first Ti workpiece and the second Ti workpiece.

The methods and structures described herein can be used to join any type of Ti-containing workpieces using a welding process, and are particularly well suited for use in the production of medical devices and medical device components. For example, the methods described herein can be used to form weld joints between Ti-containing components of an implantable medical device such as a pacemaker, a defibrillator, a catheter, and the like. In addition, the methods described herein can be used to fabricate any subcomponent of a medical device utilizing Ti-containing components to be joined such as, for example, a battery.

The methods and structures of the present invention will now be described in the following non-limiting examples.

EXAMPLES

Example 1

Figure 3A:
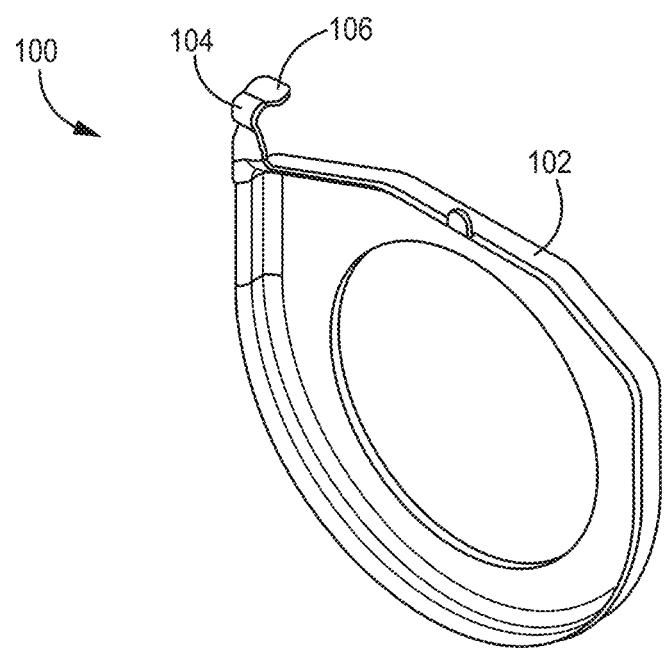
FIG. 3A is a perspective view of a cathode current collector for a battery used in the welding process of Examples 1-2.

Referring now to FIG. 3A, a cathode current collector 100 for use in a lithium battery in an implantable pacemaker device is made from Grade 1 Ti. The current collector 100 includes a body 102 and a connection tab 104 formed on a portion thereof. The connection tab 104 includes a connection surface 106. The connection surface 106 provides an area for connection to a battery cover (not shown in FIG. 3A, see FIG. 3B below).

Exposed surfaces of the cathode current collector body 102, the connection tab 104, and the connection surface 106 have applied thereon at least one protective coating layer of titanium nitride to reduce or eliminate corrosion and the result increase in resistivity, which during extended use can gradually reduce battery performance in the implantable pacemaker device.

In this example the connection surface 106 was conditioned by heating with laser heating to form thereon a connection zone a Ti—N solid solution alloy.

Figure 3B:
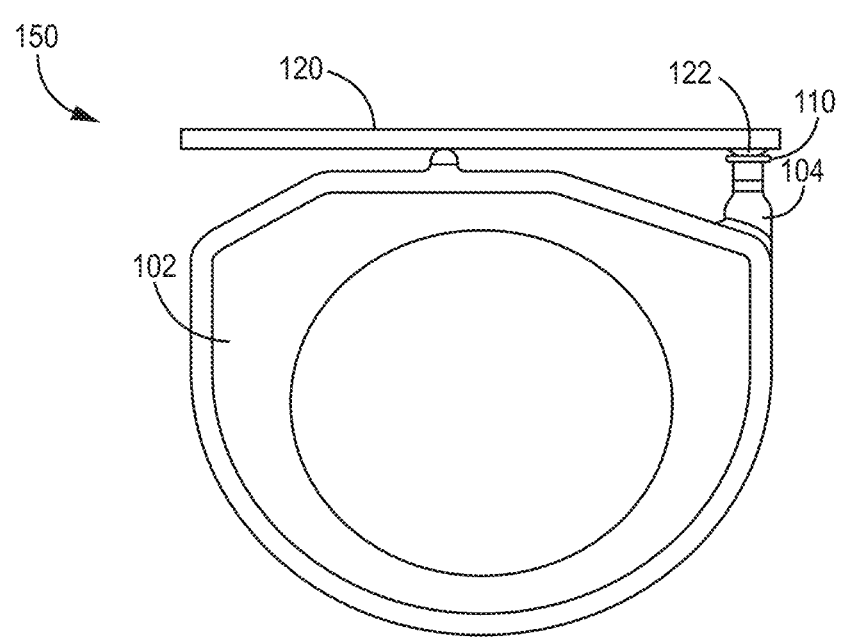
FIG. 3B is a side view showing the cathode current collector of FIG. 3A welded to a cover as described in Examples 1-2.

As shown in FIG. 3B, in a step in a process for manufacturing the battery for the implantable medical device, the cathode current collector 100 with a Ti—N solid solution connection zone 110 was then connected using a resistance spot welding (RSW) process to form a weld joint to a connection tab 122 on a battery cover 120 to form a battery subcomponent 150. Like the cathode current collector body 102 and the connection tab 104, the battery cover 120 and the connection tab 122 were formed from Grade 1 Ti.

In this example, various laser conditioning and RSW process parameters were varied, and the resulting weld joints were analyzed. The parameters are shown in Table 1 below. A series of 21 total runs were performed.

TABLE 1

| | | Setting | | |
|---|---|---|---|---|
| Category | Factors | Low | Nominal | High |
| TiN coating | ($\mu$g/cm$^2$) | 50 | 100 | 150 |
| Laser melting | Pulse width (ms) | 0.5 | 0.75 | 1.0 |
| | Diode current (%) | 20 | 23 | 26 |
| | Pulse gap (mm) | 0.20 | 0.25 | 0.30 |
| | Path ID (mm) | 0.23 | 0.30 | 0.38 |
| RSW | Weld current (A) | 670 | 725 | 780 |

In the laser conditioning process, the laser had a beam diameter of 0.012 inch (0.30 mm), a weld speed 6.0 ipm (2.5 mm/sec), and Ar shielding gas was used during the laser conditioning process. The laser melting pattern was similar to the welding pattern of FIG. 2C, and included three concentric circles and a single pulse at the center. The pulse energy and average power of the laser melt treatment were in the ranges of 0.14-0.40 J and 1.2-4.9 W, respectively.

The laser melted area varied from discontinuous to continuous melted surfaces. No weld splatters were formed on the samples. Some soot was observed on some samples, but no post treatment cleaning was attempted prior to RSW.

In the RSW process, an electrode force and a forge force of 10 lb. (4.5 kg) were used. The resistance welder utilized an upslope and a weld duration of $6.0 \times 10^{-3}$ sec, and the RSW process was conducted with an Ar shielding gas.

Five samples made according to the conditions set forth in Table 1 above were analyzed with scanning electron microscope (SEM) fracture surface analysis. A typical fracture surface is shown in the scanning electron microscope photographs of FIGS. 4A-4B. The fractures exhibited a ductile appearance across the majority of the fracture. Regions of more brittle, acicular appearance were observed near the interface for some of the samples. The regions with the brittle fracture were associated with high concentration of nitrogen in titanium.

Figure 4A:
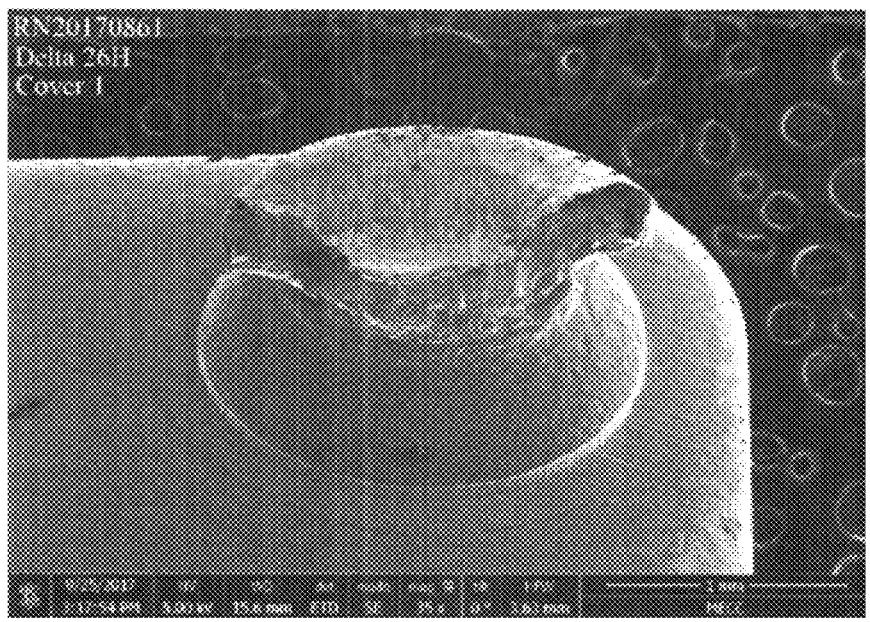
FIGS. 4A-4B are scanning electron microscope (SEM) photographs showing a fractured weld joint resulting from a pull test of a resistance weld from Example 1.
Figure 4B:
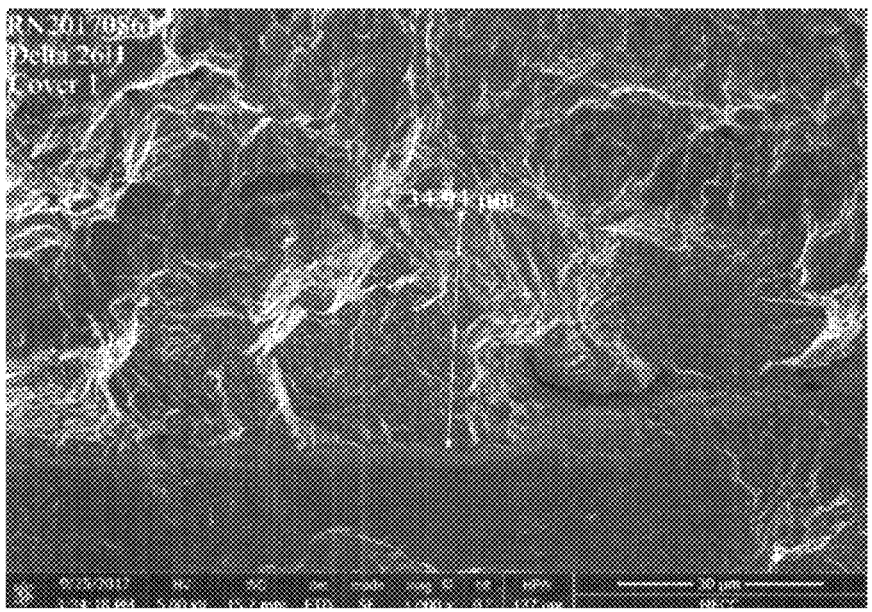

In the examples shown in FIGS. 4A-4B, the maximum thickness of the brittle fracture zone was less than 0.002 inch (0.05 mm), compared to the total current collector thickness of 0.010 inch (0.25 mm). While not wishing to be bound by any theory, during the pull test, it appeared that cracks were first initiated on these regions, then progressed across the thickness of the tab and transited into ductile fracture.

Figure 5:
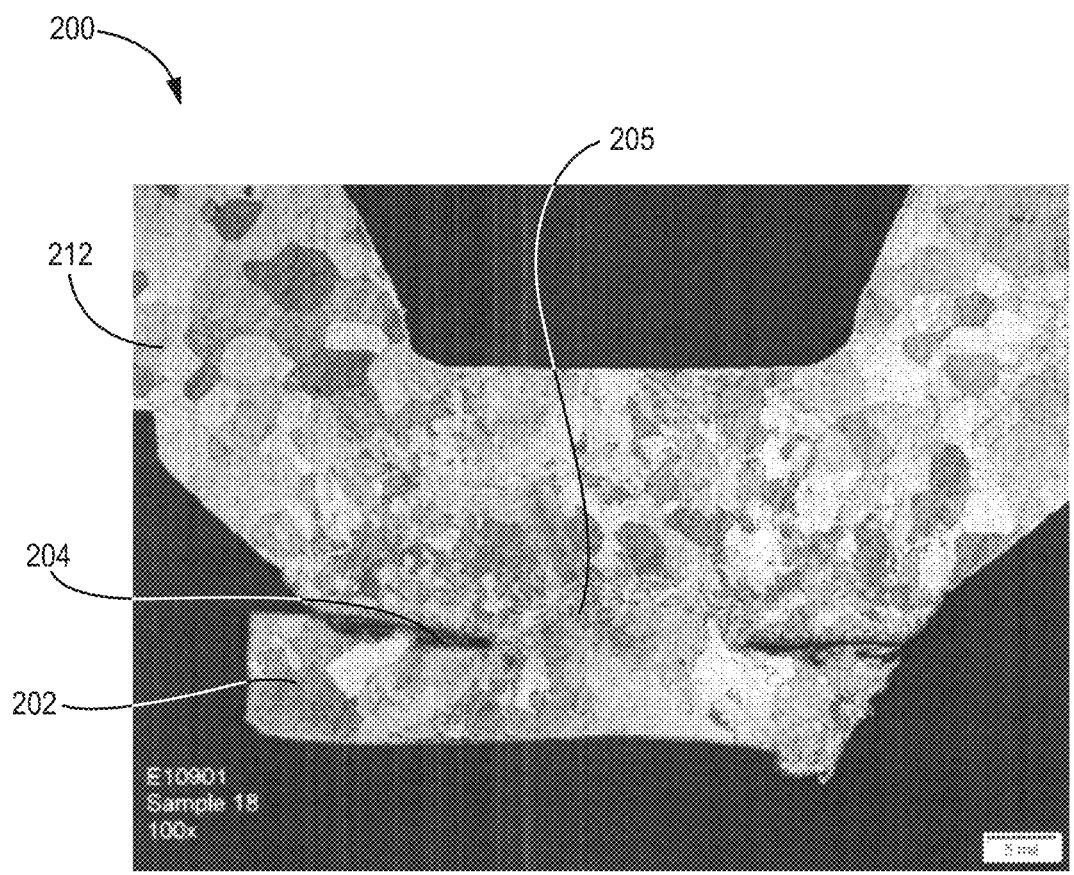
FIG. 5 is a SEM photograph of a cross section of a weld joint from a resistance weld from Example 1.

A SEM photo of a typical cross section of a welded connection produced by RSW is shown in FIG. 5. In the welded connection 200, the Ti base materials cover 212 and tab 202 have equiaxed grains typical of annealed Ti microstructure. The laser melted connection zone 204 is shown as the dark areas where nitrogen from thermal nitride coating was dissolved into a shallow layer of Ti in the range of 0.0005-0.002 inch (0.013 mm to 0.051 mm) thickness. This layer has high concentration of nitrogen and have high microhardness. During resistance spot welding (RSW), the nitrogen in the laser melted zone diffused further into the tab and cover, resulting in a weld joint 205 having an acicular microstructure with nitrogen concentration lower than the laser melted connection zone 204 but higher than in the Ti base materials 202, 212.

The microhardness was measured in the base materials 202, 212 and the RSW weld joint 205. The average microhardness in the RSW weld joint 205 was 217 HV, significantly higher than the average microhardness values of 121 HV and 133 HV of the Ti base material cover 212 and tab 202, respectively.

Statistical analysis of the microhardness in the weld joint 205 indicated that an increase in the coating thickness of the titanium nitride coating led to an increase in microhardness, while increase in diode current and RSW weld current led to a decrease in microhardness. While not wishing to be bound by any theory, these results are consistent with the fact that increase in titanium nitride coating thickness led to increased nitrogen concentration in titanium, while increased diode current for laser treatment and weld current for RSW promoted the diffusion of nitrogen into larger volume of titanium and therefore reduces the nitrogen concentration in the weld joint 205.

Example 2

60 samples in six groups were tested with process settings set forth in Table 2 below. The current collectors for groups 1-3 and groups 4-6 were from different vendors. All other process settings were the same as used in Example 1 above.

TABLE 2

| | Groups | | | | | |
|---|---|---|---|---|---|---|
| Factors | 1 | 2 | 3 | 4 | 5 | 6 |
| TiN Coating Thickness ($\mu$g/cm$^2$) | 150 | 150 | 100 | 150 | 150 | 150 |
| Pulse width (ms) | 0.5 | 0.5 | 0.5 | 0.5 | 0.5 | 0.5 |
| Diode current (%) | 23 | 23 | 23 | 23 | 23 | 23 |
| Pulse gap (mm) | 0.25 | 0.25 | 0.25 | 0.25 | 0.25 | 0.25 |
| Path ID (mm) | 0.30 | 0.30 | 0.30 | 0.30 | 0.30 | 0.30 |
| Weld current (A) | 670 | 780 | 725 | 670 | 780 | 725 |

After welding, each sample was visually examined. Then all weld samples were pull-tested for failure load using the pull test method of Example 1. The statistical summary of the pooled confirmation run failure load data showed that the weld joint failure load was in the range of 12.1-21.5 lb (5.5 kg-10 kg) with a mean of 15.1 lb (6.9 kg). It was also observed that splatters formed on 7 out 20 samples during RSW at the highest weld current of 780 A.

The results of Examples 1-2 above show that a robust RSW process for titanium nitride coated materials can be enabled by laser melt treatment of the titanium nitride coating.

While not wishing to be bound by any theory, presently available evidence indicates that during laser conditioning of the titanium nitride coating layer, the titanium nitride was dissolved and mixed with the titanium base material of the workpiece. The nitrogen atoms were redistributed within the laser melted connection zone, transforming the continuous titanium nitride intermetallic film of the titanium nitride coating into a Ti—N solid solution alloy matrix imbedded with tiny particles of titanium nitride. The Ti—N solid solution alloy has a lower liquidous temperature and higher resistance than the titanium nitride intermetallic coating itself, making it readily weldable by RSW.

The addition of nitrogen in the titanium causes increase in hardness and decrease in ductility. During the pull tests of the RSW weld joints, brittle fractures were initiated across the titanium nitride coating and the laser melted titanium nitride layer followed by ductile fracture across the uncontaminated titanium substrate. The average pull test failure load of titanium nitride coated RSW was about 15 lb (6.8 kg), which in some embodiments is sufficient for the worst use conditions typically encountered by batteries in an implantable medical device.

Various examples have been described. These and other examples are within the scope of the following claims.

EMBODIMENTS

Embodiment A. A method, comprising:
heating a region of a first workpiece comprising Ti, wherein the first workpiece comprises at least one titanium nitride coating layer, to form in the region a connection zone comprising a Ti—N solid solution alloy;
contacting a second workpiece comprising Ti with the connection zone; and
forming with a resistance welding process a weld joint across the connection zone, wherein the weld joint extends into the first Ti workpiece and the second Ti workpiece.

Embodiment B. The method of Embodiment A, wherein the connection zone comprises a Ti—N solution alloy matrix with embedded particles of titanium nitride.

Embodiment D. The method of any of Embodiments A to C, wherein the connection zone has a higher electrical resistance and a lower liquidus temperature than the titanium nitride coating layer.

Embodiment E. The method of any of Embodiments A to D, wherein the titanium nitride coating layer has an average coating thickness on the first Ti workpiece of about 85 μg/cm2 to about 140 μg/cm2.

Embodiment F. The method of any of Embodiments A to E, wherein the weld joint has an acicular microstructure and a nitrogen concentration: (1) lower than a nitrogen concentration in the connection zone, and (2) higher than a nitrogen concentration in either of the first Ti workpiece or the second Ti workpiece.

Embodiment G. The method of any of Embodiments A to F, wherein the weld joint has a microhardness higher than a microhardness of either of the first Ti workpiece or the second Ti workpiece.

Embodiment H. The method of any of Embodiments A to G, wherein the weld joint has an average pull test failure load of about 15 lb (6.8 kg).

Embodiment I. The method of any of any of Embodiments A to H, wherein the region is heated with a laser.

Embodiment J. The method of any of Embodiments A to I, wherein the resistance weld current of a welder in the resistance welding process is about 500 A to about 800 A.

Embodiment K. The method of any of Embodiments A to J, wherein the weld joint is formed under an inert shielding gas.

Embodiment L. The method of Embodiment K, wherein the shielding gas comprises Ar.

Embodiment M. The method of any of Embodiments A to L, wherein a welder in the resistance welding process forms the weld joint with a substantially circular weld path.

Embodiment N. The method of Embodiment M, wherein the weld path comprises concentric circles.

Embodiment O. A method of making a battery for an implantable medical device, the method comprising:
providing a first battery component comprising a Ti alloy, the first battery component further comprising a connection region overlain by a titanium nitride coating layer;
heating the connection region with a laser to form in the connection region a connection zone comprising a Ti—N solid solution alloy;
providing a second battery component, the second battery component comprising a Ti alloy;
contacting a surface of the second battery component with the connection zone; and
forming with a resistance welding process a weld joint across the connection zone, wherein the weld joint extends into the first battery component and the second battery component, and wherein the weld joint has an acicular microstructure.

Embodiment P. The method of Embodiment O, wherein the weld joint has a nitrogen concentration: (1) lower than a nitrogen concentration in the connection zone, and (2) higher than a nitrogen concentration in either of the first battery component and the second battery component.

Embodiment Q. The method of any of Embodiments O to P, wherein the first battery component is a cathode current collector.

Embodiment R. The method of Embodiment Q, wherein the connection region comprises a tab on the cathode current collector.

Embodiment S. The method of any of Embodiments O to R, wherein the second battery component is a cover.

Embodiment T. An implantable medical device comprising a battery, wherein the battery comprises a resistance weld between a first component comprising Ti and a second component comprising Ti, wherein the resistance weld extends across a connection zone comprising a Ti—N solid solution alloy, and wherein the resistance weld has an acicular microstructure and a nitrogen concentration: (1) lower than a nitrogen concentration in the connection zone, and (2) higher than a nitrogen concentration in either of the first Ti alloy component or the second Ti alloy component.

The invention claimed is:

1. A workpiece comprising Ti or a Ti alloy, wherein the workpiece comprises:
    a surface with at least one coating layer comprising titanium nitride; and
    a conditioned connection zone in both a region of the surface and a portion of the at least one coating layer within the region,
        wherein the region of the surface is smaller than the entire surface,
        wherein the conditioned connection zone comprises a Ti—N solid solution alloy, and
        wherein the conditioned connection zone is formed by heating the region of the surface and the portion of the at least one coating layer within the region such that the titanium nitride in the portion of the at least one coating layer is dissolved and mixed with the Ti or Ti alloy in the region of the surface and causes the conditioned connection zone to have at least one of a higher electrical resistance than the coating layer or a lower liquidus temperature than the coating layer.

2. The Ti workpiece of claim 1, wherein the Ti—N solid solution alloy comprises a matrix with embedded particles of titanium nitrides.

3. The Ti workpiece of claim 1, wherein the conditioned connection zone has both a higher electrical resistance than the coating layer and a lower liquidus temperature than the coating layer.

4. The Ti workpiece of claim 1, wherein the coating layer consists essentially of titanium nitrides.

5. The Ti workpiece of claim 1, wherein the coating layer is directly on the Ti or Ti alloy.

6. The Ti workpiece of claim 4, wherein the coating layer has an average coating thickness on the workpiece of about 50 μg/cm$^2$ to about 200 μg/cm$^2$.

7. The Ti workpiece of claim 4, wherein the coating layer has an average coating thickness on the workpiece of about 85 μg/cm$^2$ to about 140 μg/cm$^2$.

8. An article, comprising:
    a first workpiece comprising Ti, wherein the first workpiece comprises a first surface with at least one coating layer comprising titanium nitride, and a conditioned connection zone in both a region of the first surface and a portion of the at least one coating layer within the region,
        wherein the region of the first surface is smaller than the entire first surface,
        wherein the conditioned connection zone comprises a Ti—N solid solution alloy, and
        wherein the conditioned connection zone is formed by heating the region of the first surface and the portion of the at least one coating layer within the region such that the titanium nitride in the portion of the at least one coating layer is dissolved and mixed with the Ti or Ti alloy in the region of the first surface and causes the conditioned connection zone to have at least one of a higher electrical resistance than the coating layer or a lower liquidus temperature than the coating layer;
    a second workpiece comprising Ti, wherein the second workpiece comprises a second surface contacting the conditioned connection zone; and
    a weld joint extending across the conditioned connection zone and extending into the first surface of the first workpiece and the second surface of the second workpiece, wherein the weld joint comprises an acicular microstructure and a nitrogen concentration: (1) lower than a nitrogen concentration in the conditioned connection zone, and (2) higher than a nitrogen concentration in either of the first workpiece or the second workpiece.

9. The article of claim 8, wherein the weld joint has a microhardness higher than a microhardness of either of the first workpiece or the second workpiece.

10. The article of claim 8, wherein the coating layer has an average coating thickness of about 50 μg/cm$^2$ to about 200 μg/cm$^2$.

11. The article of claim 8, wherein the coating layer has an average coating thickness of about 85 μg/cm$^2$ to about 140 μg/cm$^2$.

12. The article of claim 8, wherein the weld joint has a pull test failure load of about 15 lb.

13. A method comprising conditioning a region of a surface of a workpiece comprising Ti for subsequent resistance welding across the region, wherein the region of the surface is smaller than the entire surface, wherein the surface of the workpiece comprises at least one coating layer comprising titanium nitride, and wherein the method comprises heating the region, including a portion of the at least one coating layer within the region, such that the portion of the titanium nitride coating layer is dissolved and mixed with the Ti of the workpiece in the region of the surface to form a conditioned connection zone comprising a Ti—N solid solution alloy, wherein the conditioned connection zone has at least one of a higher electrical resistance than the coating layer or a lower liquidus temperature than the coating layer.

14. The method of claim 13, wherein the region is heated with a laser at a temperature and for a time sufficient to dissolve titanium nitride in the coating layer and mix the titanium nitride with the Ti of the workpiece and form the conditioned connection zone.

15. The method of claim 13, wherein the Ti—N solid solution alloy comprises a matrix with embedded particles of titanium nitride.

16. The method of claim 13, wherein the conditioned connection zone has a higher electrical resistance and a lower liquidus temperature than the titanium nitride coating layer.

17. The method of claim 13, wherein the titanium nitride coating layer has an average coating thickness on the workpiece of about 50 μg/cm$^2$ to about 200 μg/cm$^2$.

* * * * *